United States Patent [19]

Schwendeman et al.

[11] Patent Number: 5,757,281
[45] Date of Patent: May 26, 1998

[54] MULTIPLE ACKNOWLEDGE-BACK RESPONSE DATA PAGING

[75] Inventors: Robert John Schwendeman, Pompano Beach; William Joseph Kuznicki, Coral Springs, both of Fla.

[73] Assignee: Motorola, Inc., Schaumburg, Ill.

[21] Appl. No.: 633,498

[22] Filed: Apr. 21, 1992

Related U.S. Application Data

[63] Continuation of Ser. No. 431,127, Nov. 3, 1989, abandoned.

[51] Int. Cl.$^6$ ............................. H04Q 7/00; G08B 5/22; G08B 23/00
[52] U.S. Cl. ......................... 340/825.55; 340/825.44; 340/825.47; 340/502; 340/942
[58] Field of Search .................. 340/825.55, 825.44, 340/825.47, 825.48, 311.1, 502, 505, 934, 942, 944; 455/32.1, 38.4

[56] References Cited

U.S. PATENT DOCUMENTS

| | | |
|---|---|---|
| 4,173,016 | 10/1979 | Dickson ........................ 340/505 |
| 4,254,404 | 3/1981 | White ........................... 340/825.48 |
| 4,646,082 | 2/1987 | Engel et al. ................... 340/505 |
| 4,646,358 | 2/1987 | Shanley ........................ 340/825.48 |
| 4,797,948 | 1/1989 | Milliorn et al. ............... 340/825.47 |
| 4,814,763 | 3/1989 | Nelson et al. ................. 340/311.1 |
| 4,868,560 | 9/1989 | Oliwa et al. .................. 340/825.48 |
| 4,882,579 | 11/1989 | Siwiak ......................... 340/825.47 |
| 4,926,460 | 5/1990 | Gutman et al. ................ 379/57 |
| 4,940,963 | 7/1990 | Gutman et al. ................ 340/313 |
| 4,951,044 | 8/1990 | Nelson et al. ................. 340/825.44 |

Primary Examiner—Brian Zimmerman
Assistant Examiner—Edward Merz
Attorney, Agent, or Firm—Gregg Edward Rasor

[57] ABSTRACT

An improved acknowledge-back paging system which returns variable amounts of information requested to the individual or device requesting the information. The system uses a selective call receiver that receives a signal requesting information from the selective call receiver. In response to the signal, multiple acknowledge-back signals comprising the information are transmitted to a receiving station.

22 Claims, 5 Drawing Sheets

MULTIPLE ACKNOWLEDGE-BACK RESPONSE DATA PAGING

This is a continuation of application Ser. No. 431,127, filed Nov. 3, 1989 and now abandoned.

FIELD OF THE INVENTION

This invention relates in general to radio paging systems and more particularly to acknowledge-back paging systems.

BACKGROUND OF THE INVENTION

Paging systems typically use a receiver that has at least one unique selective call address associated therewith. This receiver is commonly referred to as a selective call receiver or pager. When a pager receives and decodes its address, the pager typically alerts the user to the presence of incoming information and operates to present this information.

Acknowledge-Back (ack-back) selective call receivers are those selective call receivers that transmit an acknowledge signal in response to receiving their selective call address or a message. These selective call receivers provide the individual or device initiating the transmission a response indicating that the designated selective call receiver was in service and/or that the selective call message has been received. To do this, the channel used to carry the selective call address may also be used as the acknowledge channel if signalling through-put is not adversely affected. However, to maximize system effectiveness, acknowledge signals may be transmitted on one or more channels established within the paging system as acknowledge channels.

Acknowledge-back paging systems for the transmission and reception of radio frequency information are well known to those skilled in the art. Presently, acknowledge-back paging systems provide acknowledgement by the transmission of a continuous wave carrier or a single coded signal identifying the selective call receiver. Using the aforementioned approach provides only small portions of data from the selective call receiver. Present systems cannot provide a more detailed response or acknowledgement.

Thus, what is needed is a method which provides a means for returning varying amounts of information in response to the selection of a selective call receiver.

SUMMARY OF THE INVENTION

Accordingly, it is an object of the present invention to provide an improved acknowledge-back paging system that returns variable amounts of information requested to the individual or device requesting the information.

In carrying out the above and other objects of the invention in one form, there is provided a method using a selective call receiver comprising the steps of receiving at least one signal requesting information having first and second parts and transmitting in response to the at least one signal at least two acknowledge-back signals comprising the information.

DETAILED DESCRIPTION OF THE INVENTION

Figure 1:
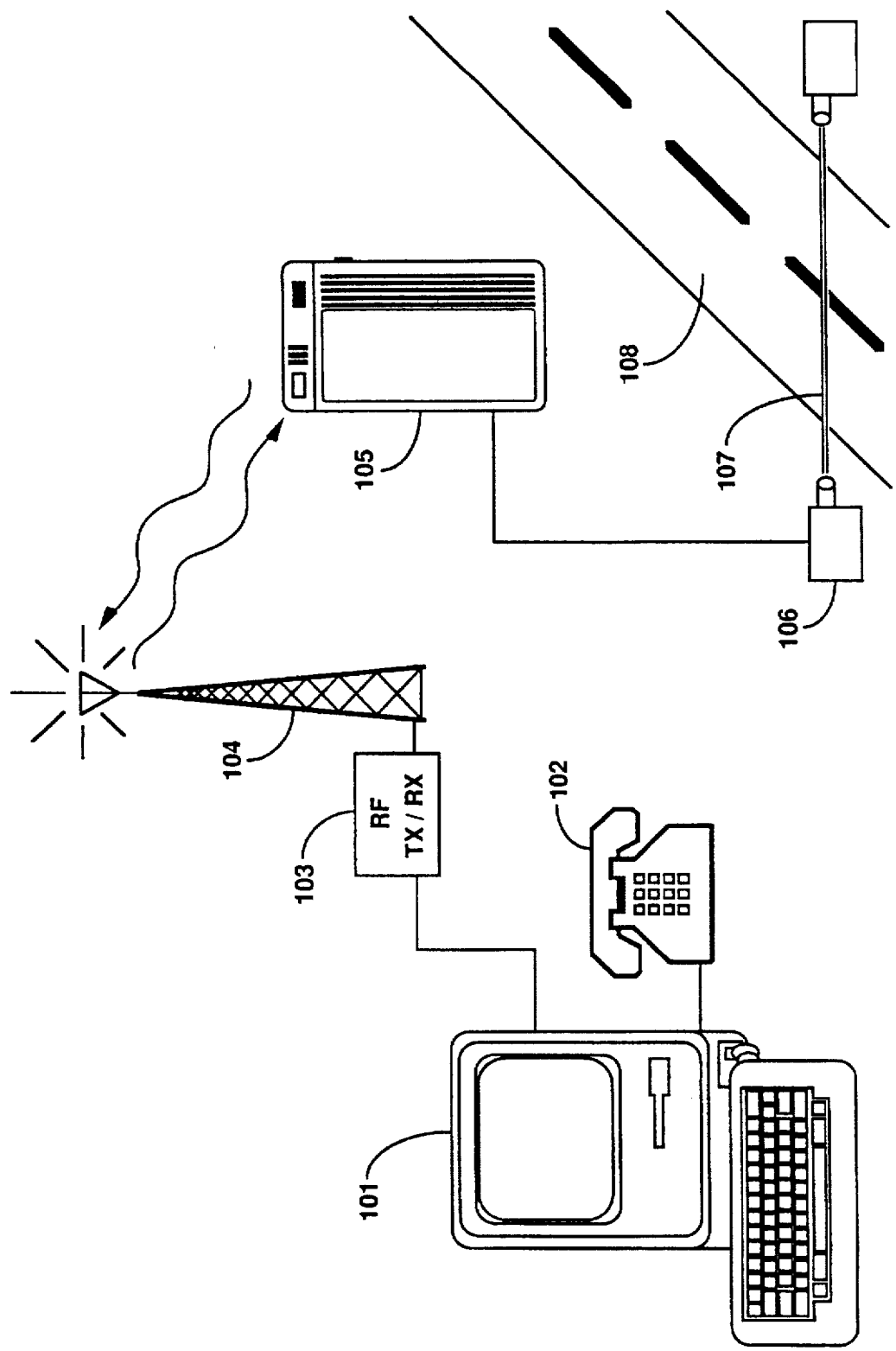
FIG. 1 is a system diagram in accordance with the preferred embodiment.
Figure 5:
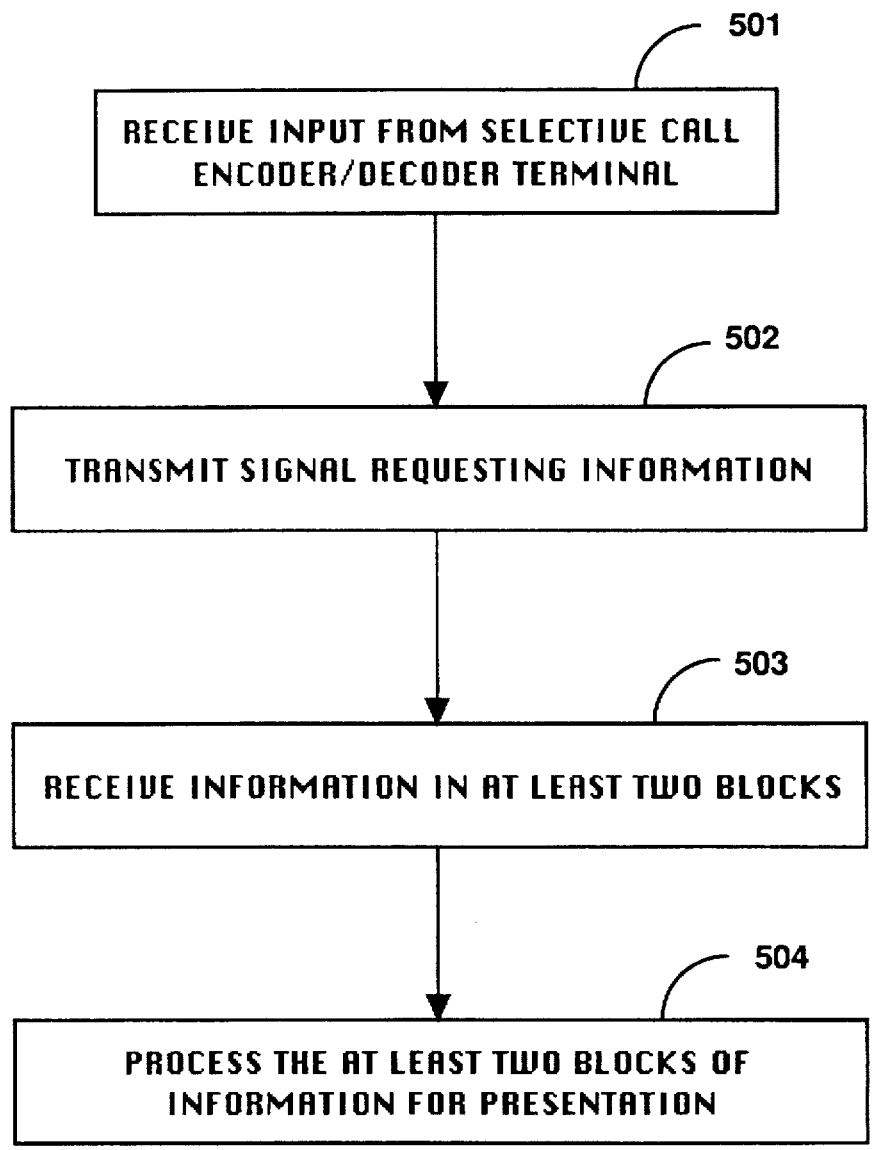
FIGS. 5 and 6 are flow diagrams describing the operation of the terminal and selective call receiver.
Figure 6:
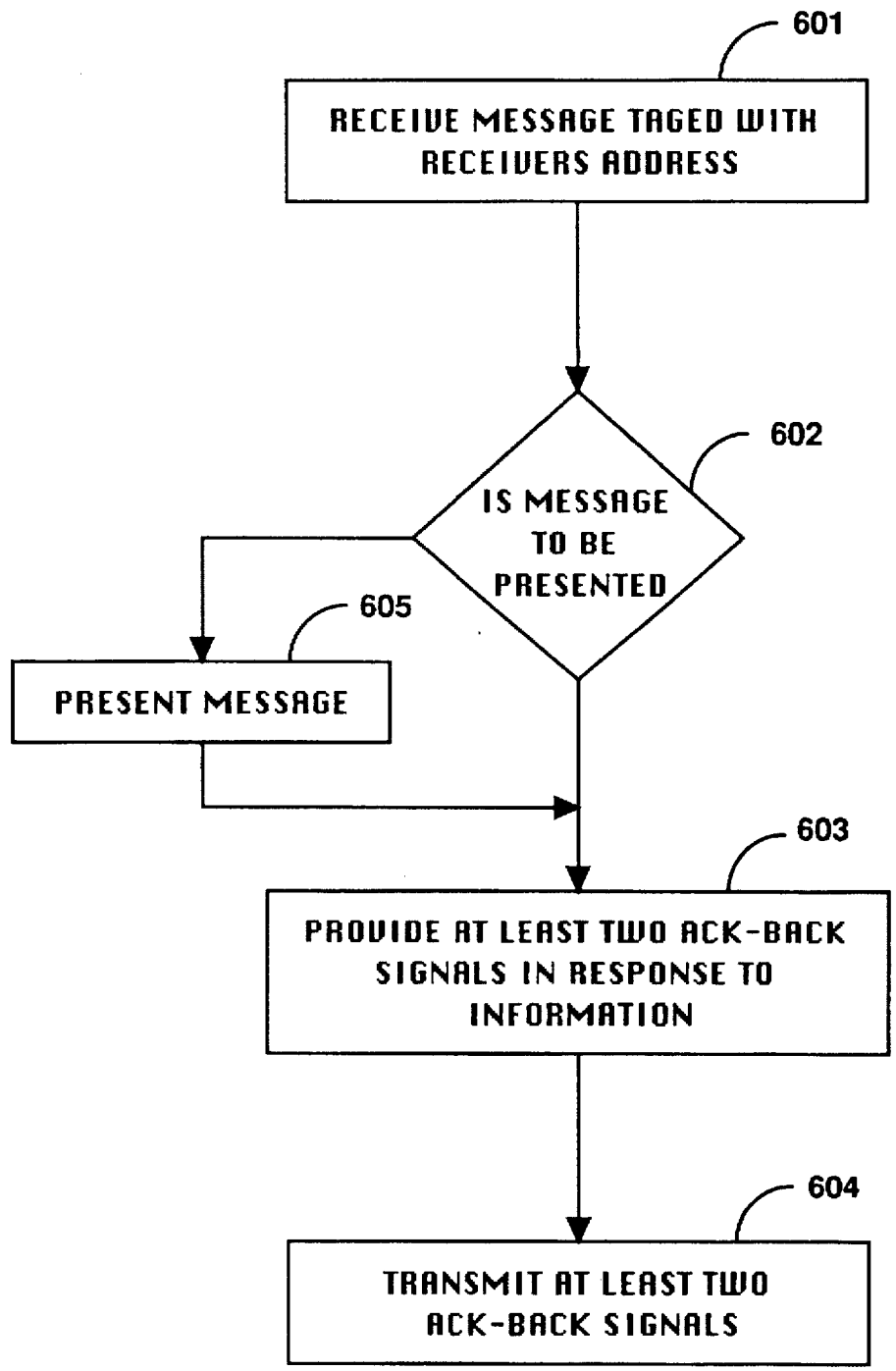

Referring to FIG. 1, the preferred embodiment of the multiple acknowledge-back response paging system comprises a selective call encoding/decoding terminal 101 that is coupled to a telephone data entry and communication device 102, radio frequency transmitter/receiver 103, and an antenna system 104. An acknowledge-back selective call receiver 105 is coupled to an information measurement device 106 which in this embodiment is used to detect the number of interruptions of the light beam 107 crossing the roadway 108. In this embodiment, the information measurement device 106 has the capability to accumulate and save the total number of interruptions as well as detecting the current state of the light beam 107 (on or off). When a user desires to interrogate the accumulated count in the information measurement device 106, the user may either run a program resident on the selective call encoding/decoding terminal 101 or enter a predetermined number via the telephone data entry and communication device 102 (FIG. 5, step 501) that selects the desired acknowledge-back selective call receiver 105 (FIG. 5, step 502). When selected (FIG. 6, step 601), the acknowledge-back selective call receiver 105 will perform the function associated with the address selected and/or message data received. In this embodiment, the functions available are a) reset accumulator, b) read accumulator, and c) read current detector state (beam on or off). The acknowledge-back selective call receiver 105 will perform the selected function (FIG. 6, step 603) and return any information required by the execution of the function via the antenna system 104 (FIG. 6, step 604) to the radio frequency transmitter/receiver 103. The information is recovered by the radio frequency transmitter/receiver 103 (FIG. 5, step 503) and forwarded to the selective call encoding/decoding terminal 101 where it is decoded and made available for presentation to the requesting device. The returned information may be presented in a number of ways (FIG. 5, step 504). If the user had requested the information via the telephone data entry and communication device 102 the data may be returned as a synthesized voice message or ASCII (American Standard Code for Information Exchange) characters depending on the data return mode requested by the user.

Figure 2:
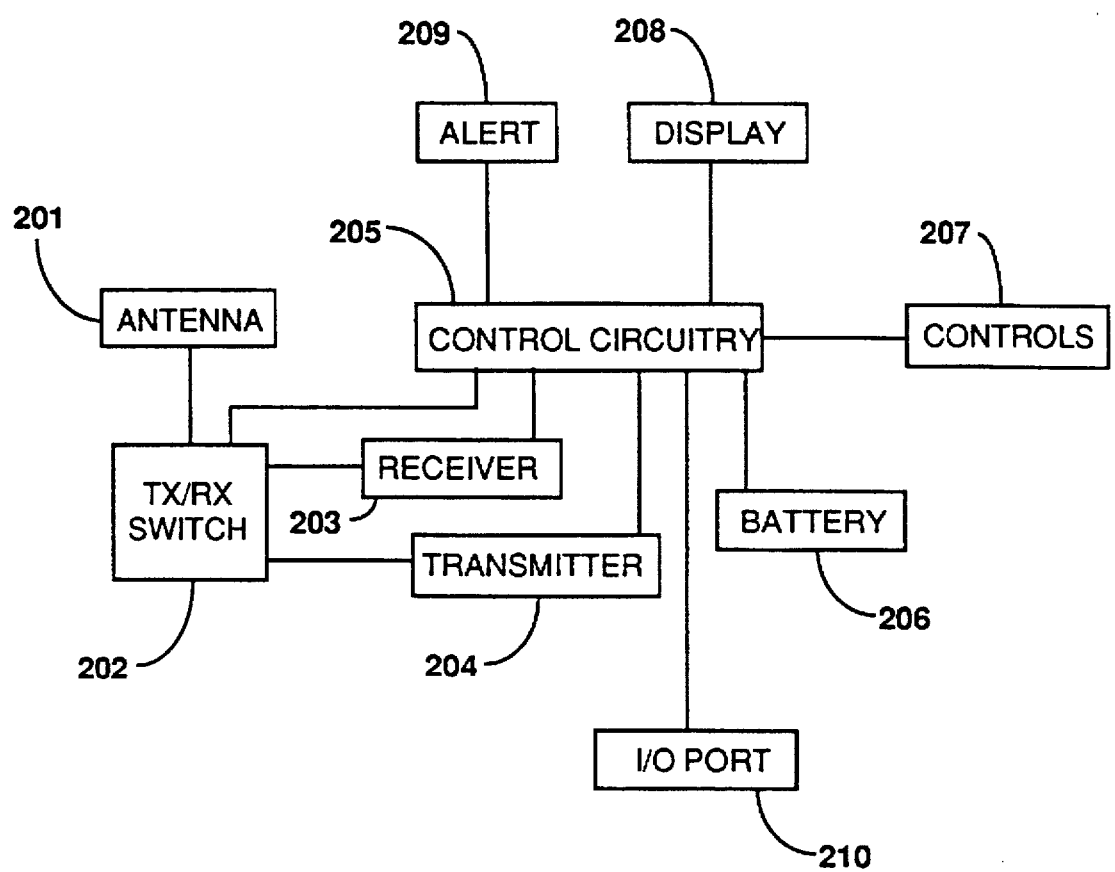
FIG. 2 is a block diagram of the selective call receiver system in accordance with the preferred embodiment.

Referring to FIG. 2, a battery 206 powered acknowledge-back selective call receiver 105 operates to receive a signal via an antenna 201. The received signal is routed via an TX/RX switch 202 to a receiver 203. The receiver 203 demodulates the received signals using conventional techniques and forwards the demodulated signal to the control circuitry 205, which decodes and recovers information contained within the received signal. In accordance with the recovered information and user controls 207, the selective call receiver presents at least a portion of the information (FIG. 6, step 602), such as by a display 208, and signals the user via a sensible alert 209 that a message has been received. The acknowledge-back selective call receiver 105 can upon being commanded read or write information from/to a peripheral device (not shown) that is connected to the control circuitry 205 via an input/output port 210.

In the preferred embodiment of the present invention, the selective call receiver comprises an acknowledge-back pager, which includes a transmitter 204 so as to transmit an acknowledge signal on one or more acknowledge channels. Optionally, the acknowledge-back pager may be powered by a battery eliminator such as an AC to DC power supply.

Figure 3:
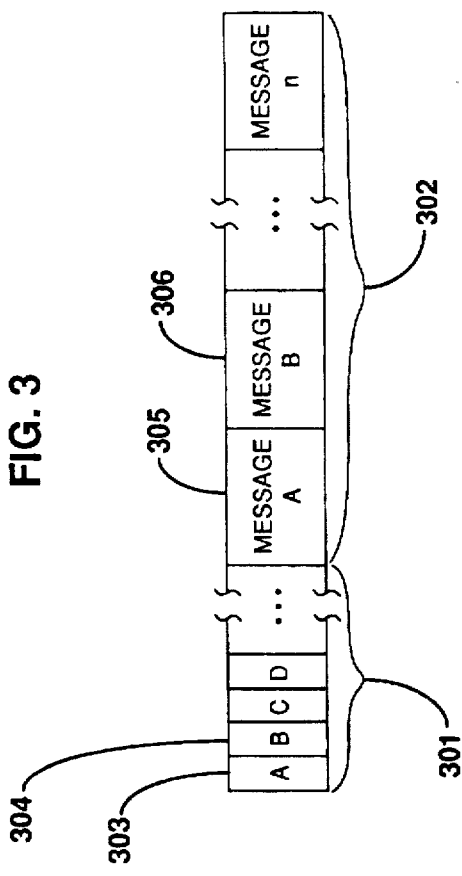
FIG. 3 is a diagram of a selective call signalling format.

Referring to FIG. 3, a selective call signalling format comprises an address field 301 and message field 302. The address field may comprise a plurality of pager addresses 303, 304. The first 303 and second 304 pager addresses, respectively, have corresponding information in message A 305 and message B 306.

Figure 4:
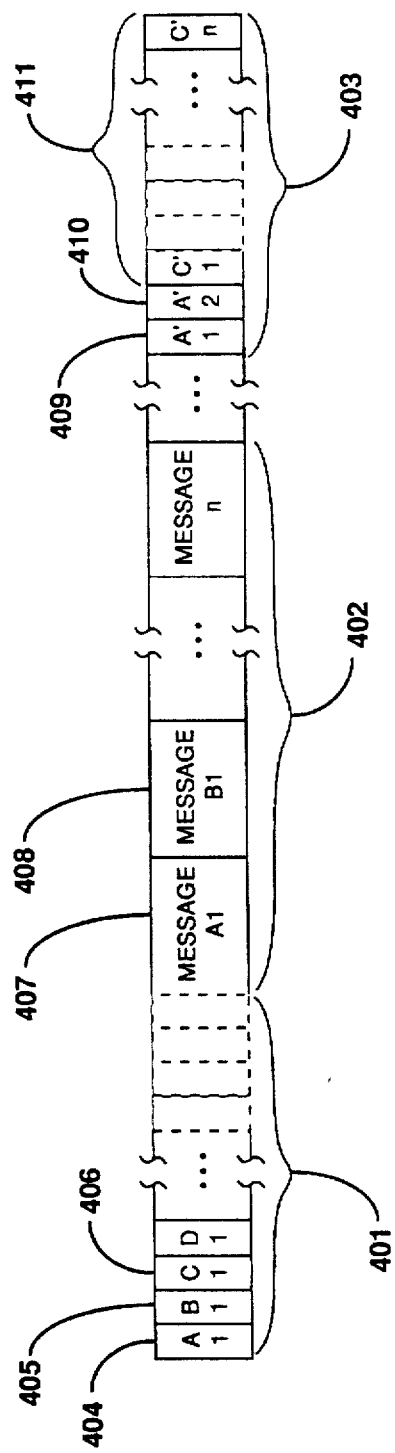
FIG. 4 is a diagram of the acknowledge-back selective call signalling format in accordance with the preferred embodiment.

Referring to FIG. 4, the preferred embodiment of the acknowledge-back selective call signalling format comprises an address field 401, a message field 402, and an acknowledgement field 403. The address field comprises a plurality of selective call addresses including selective call addresses 404, 405, 406. The first 404 and second 405 selective call addresses have corresponding information in message A1 407 and message B1 408, respectively. The third address 406 has no message associated therewith and serves only to activate an acknowledge-back response from the selective call receiver being addressed. This signalling format is structured so it can coexist with present selective call signalling protocols such as GSC (Motorola's Golay Sequential Code) or POCSAG (Great Britain's Post Office Code Standardisation Advisory Group) on a single or multiple frequency channels. The selective call addresses are grouped in a field 401 preceding any messages that may correspond with the addresses. A message field 402 follows the selective call address field 401 wherein each message contains information that is recovered and decoded by a selective call receiver in response to decoding an address that signifies message information is required for presentation or extended function activation capability. The acknowledge-back responses are transmitted back to a receiving site (or possibly a distributed receiver network in a wide coverage area) and processed by the selective call encoding/decoding terminal 101 such that a response can be returned to the selective call originator. System protocol organization and timing of the acknowledge-back responses is structured to optimize the effective information throughput on the channel. The acknowledge-back responses are transmitted in an acknowledgement field 403 following the transmission of the last message in the message field 402. In the preferred embodiment of this invention, the acknowledge-back selective call receiver determines from information associated with the protocol structure and a predetermined mode programmed into the acknowledge-back selective call receiver, when to begin transmission of the acknowledge-back responses. When multiple acknowledge-back selective call receivers respond, the transmissions are organized in a first selected, first to respond order. As shown in FIG. 4, the first selective call address 404 is associated with a corresponding message A1 407 and acknowledge-back responses A'1 409 and A'2 410. The second acknowledge-back address C1 406 is related to a string of acknowledge-back responses C'1 thru C'n 411. The system may provide a queuing mechanism for synchronization of the responses when multiple acknowledge-back transmissions are returned to the receiving site. Alternately, the system may be structured as to allow only two acknowledge-back responses per selective call address. In this system, the selective call encoding/decoding terminal 101 would repetitively page the acknowledge-back selective call receiver and buffer the acknowledge-back responses until the requested information is received. When all requested information has been received, the selective call encoding/decoding terminal 101 would transmit the information to the selective call originator. The transmission would be returned to the originator using a predetermined format (eg. voice synthesis for a user originated telephone page or binary/ASCII data for a computer originated request) associated with the page entry method. This alternate system would be useful if the data to be returned is not time critical. Typical applications for a non time critical system would be in monitoring the slowly changing water level in a tidal basin or retrieving historical data from a remote meteorological monitoring site.

We claim:

1. In a selective call receiver, a method comprising the steps of:

generating information representing at least one measured quantity or operating state as detected by an information measurement device;

receiving from a selective call radio frequency transmitter/receiver at least one signal requesting the information; and transmitting to said selective call radio frequency transmitter/receiver in response to said at least one signal at least two acknowledge-back signals representing at least two portions of a message representing the information, said at least two acknowledge-back signals being processed by said selective call radio frequency transmitter/receiver to yield the requested information.

2. The method according to claim 1 wherein said receiving step comprises the step of receiving an address positioned within a field of addresses to provide a received address.

3. The method according to claim 1 wherein said receiving step comprises the step of receiving a message positioned within a field of messages to provide a received message.

4. The method according to claim 1 wherein said transmitting step comprises the step of transmitting at least two acknowledge-back signals corresponding to a received address as determined by the position of said received address within a field of addresses.

5. The method according to claim 1 wherein said transmitting step comprises the step of transmitting said information, said information having at least two portions, said at least two acknowledge-back signals comprising said at least two portions.

6. In a selective call system comprising a selective call receiver and a selective call encoding/decoding terminal, a method comprising the steps of:

(a) transmitting a signal initiated by a requestor from said selective call encoding/decoding terminal;

(b) receiving said signal by said selective call receiver to provide a received signal;

(c) transmitting from said selective call receiver in response to said received signal at least two acknowledge-back signals comprising information responsive to said received signal; the information representing at least one measured quantity or operating state as detected by an information measurement device;

(d) receiving said at least two acknowledge-back signals by said selective call encoding/decoding terminal; and (e) processing said at least two acknowledge-back signals representing at least two portions of a message representing the information, to yield the information representing the at least one measured quantity or operating state as detected by the information measurement device.

7. The method according to claim 6 wherein step (b) comprises the step of receiving an address positioned within a field of addresses to provide a received address.

8. The method according to claim 6 wherein step (b) comprises the step of receiving a message positioned within a field of messages to provide a received message.

9. The method according to claim 6 wherein step (c) comprises the step of transmitting at least two acknowledge-back signals corresponding to a received address as determined by the position of said received address within a field of addresses.

10. A selective call system including a selective call receiver and a selective call encoding/decoding terminal comprising:

an information measurement device for generating information representing at least one measured quantity or operating state;

first means for receiving at least one signal designated by a requester at said selective call encoding/decoding terminal to provide a first received signal requesting the information;

second means for transmitting from said selective call receiver in response to said at least one signal at least two acknowledge-back signals comprising said information;

third means for receiving with said selective call encoding/decoding terminal said at least two acknowledge-back signals to provide a second received signal; and fourth means within said selective call encoding/decoding terminal for providing to said requestor said information re-constructed from said second received signal, said information comprising a message having at least two portions corresponding to the at least two acknowledge-back signals, respectively, and representing the at least one measured quantity or operating state as detected by the information measurement device.

11. The selective call receiver according to claim 10 wherein said first means for receiving comprises fifth means for receiving an address positioned within a field of addresses to provide a received address.

12. The selective call receiver according to claim 10 wherein first means for receiving comprises fifth means for receiving a message positioned within a field of messages to provide a received message.

13. The selective call receiver according to claim 10 wherein said second means comprises fifth means for transmitting at least two acknowledge-back signals corresponding to a received address as determined by the position of said received address within a field of addresses.

14. The selective call receiver according to claim 10 wherein said second means comprises fifth means for transmitting information having at least two portions corresponding to the at least two acknowledge-back signals, respectively.

15. The selective call encoding/decoding terminal according to claim 10 wherein said third means comprises fifth means for receiving said at least two acknowledge-back signals and processing said information from said at least two acknowledge-back signals.

16. The selective call encoding/decoding terminal according to claim 10 wherein said fourth means comprises returning said information to said requestor in a predetermined format designated by said requestor at origination.

17. An apparatus for performing a function having information regarding the status of said function comprising:

an information measurement device for generating information representing at least one measured quantity or operating state;

means for receiving from a selective call radio frequency transmitter/receiver at least one paging signal requesting said information; and means for transmitting to said selective call radio frequency transmitter/receiver in response to said at least one paging signal at least two acknowledge-back signals representing at least two portions of a message, said at least two acknowledge-back signals being processed by said selective call radio frequency transmitter/receiver to yield the requested information representing at least one measured quantity or operating state.

18. A selective call receiver comprising:

an information measurement device for generating information representing at least one measured quantity or operating state;

means for receiving from a selective call radio frequency transmitter/receiver at least one signal requesting the information; and means for transmitting to said selective call radio frequency transmitter/receiver in response to said at least one signal at least two acknowledge-back signals representing at least two portions of a message, said at least two acknowledge-back signals being processed by said selective call radio frequency transmitter/receiver to yield the requested information representing at least one measured quantity or operating state.

19. The selective call receiver according to claim 18 wherein said means for receiving comprises receiving an address positioned within a field of addresses to provide a received address.

20. The selective call receiver according to claim 18 wherein said means for receiving comprises receiving a message positioned within a field of messages to provide a received message.

21. The selective call receiver according to claim 18 wherein said means for transmitting comprises transmitting at least two acknowledge-back signals corresponding to a received address as determined by the position of said received address within a field of addresses.

22. The selective call receiver according to claim 18 wherein said means for transmitting comprises transmitting said information, said information having at least two portions corresponding to the at least two acknowledge-back signals, respectively, and representing the at least one measured quantity or operating state as detected by the information measurement device.

* * * * *